United States Patent
Zhu et al.

(10) Patent No.: US 7,855,876 B2
(45) Date of Patent: Dec. 21, 2010

(54) PORTABLE COMPUTER

(75) Inventors: Hong-Wei Zhu, Shenzhen (CN);
Hai-Yang Yu, Shenzhen (CN);
Er-Zheng Zhao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 77 days.

(21) Appl. No.: 12/468,867

(22) Filed: May 19, 2009

(65) Prior Publication Data

US 2010/0165560 A1     Jul. 1, 2010

(51) Int. Cl.
*G06F 1/16* (2006.01)

(52) U.S. Cl. ............. 361/679.12; 345/169; 248/281.11; 400/496; 705/27

(58) Field of Classification Search .................. 345/168, 345/8, 169, 156, 157; 361/679.01, 679.12, 361/679.2, 679.1, 679.02, 679.31, 679.27, 361/679.08, 679.09, 679.18, 679.05, 679.55, 361/679.14; 248/176.1, 284.1, 188.6, 126, 248/281.11, 129, 274.1; 341/22, 32, 24; 312/316, 235.9; 400/472, 488, 495, 496, 400/492, 161.5; 705/14.51, 27
See application file for complete search history.

(56) References Cited

U.S. PATENT DOCUMENTS 6,972,946 B2 * 12/2005 Hamada et al. ........ 361/679.01
2010/0177045 A1 * 7/2010 Lu ........................... 345/168

* cited by examiner

*Primary Examiner*—Hung V Duong
(74) *Attorney, Agent, or Firm*—Frank R. Niranjan

(57) ABSTRACT

A portable computer includes a main body including a bottom sheet and a panel which cooperatively form a receiving cavity, a display, a pivot shaft connecting the main body to the display, a keyboard, a pushing member including a pushing body, two connecting rods, and two restricting members. The panel includes a first surface facing the bottom sheet. The keyboard includes a first side, a second side, a flexible blocking member, and at least one auto-flick pivot on the second side. The restricting members are received in the receiving cavity corresponding to the connecting rods. Each restricting member includes a liftable restricting portion positioned on the bottom sheet. The auto-flick pivot connects the keyboard to the main body. Each connecting rod movably connects the keyboard to the main body. The pushing body is movably connected to the first surface and moves from a first position to a second position.

19 Claims, 15 Drawing Sheets

PORTABLE COMPUTER

BACKGROUND

1. Technical Field

The disclosure relates to portable computers and, particularly, to a portable computer with an adjustable keyboard.

2. Description of Related Art

Referring to FIG. 15, a typical portable computer 1 includes a display 2 and a main body 3 connected to the display 2 by a pivot 4. A keyboard, a central process unit (CPU) and a hard disk (HD) (not shown) are assembled inside the main body 3. Two legs 5 are retractably mounted on two sides of the bottom of the main body 3.

When the portable computer 1 is in use, the main body 3 is supported by the two legs 5 to be tilted relative to a desktop 6. Therefore, this makes it more convenient for typing. However, if the two legs 5 slip or malfunction, the main body 3 of the portable computer 1 may fall on the desktop 6 and internal components of the portable computer 1, such as the hard disk, may be damaged.

Therefore, what is needed, is to provide a portable computer, which can overcome the above-mentioned problem.

DETAILED DESCRIPTION

Figure 1:
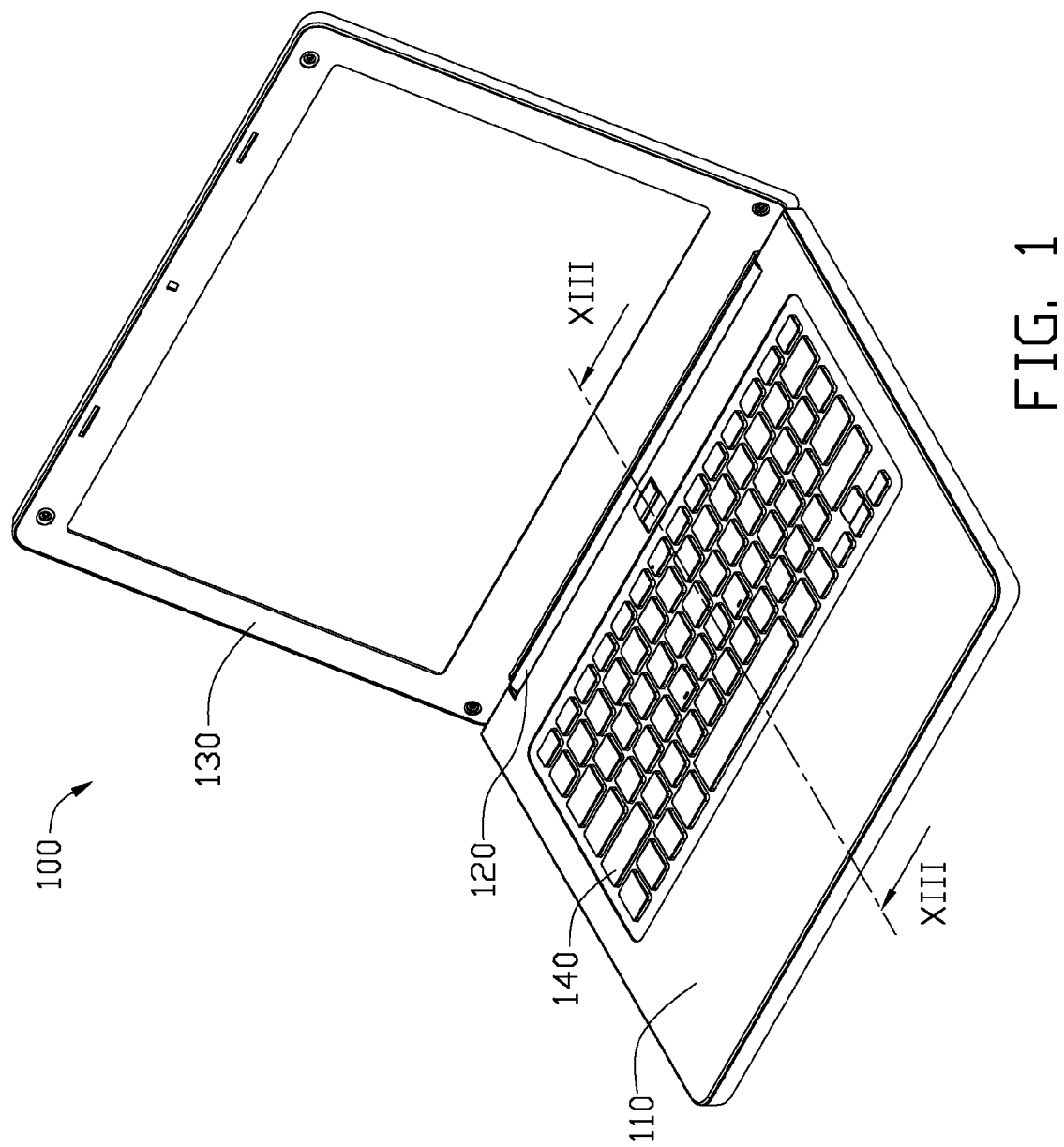
FIG. 1 is an isometric view of a portable computer including a main body and a keyboard according to an exemplary embodiment, showing the keyboard being received in the main body.
Figure 2:
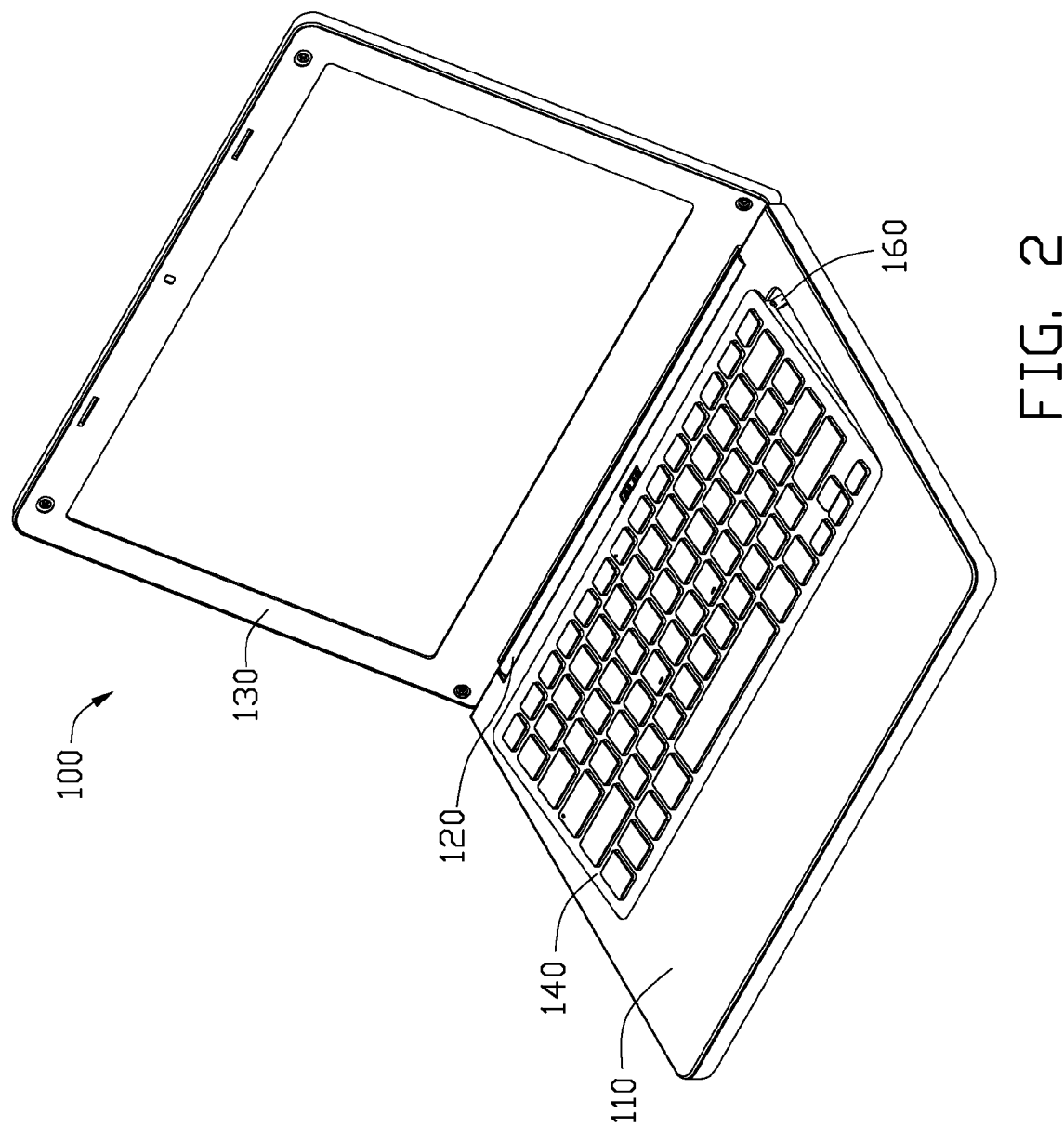
FIG. 2 is similar to FIG. 1, showing the keyboard being tilted relative to the main body.
Figure 3:
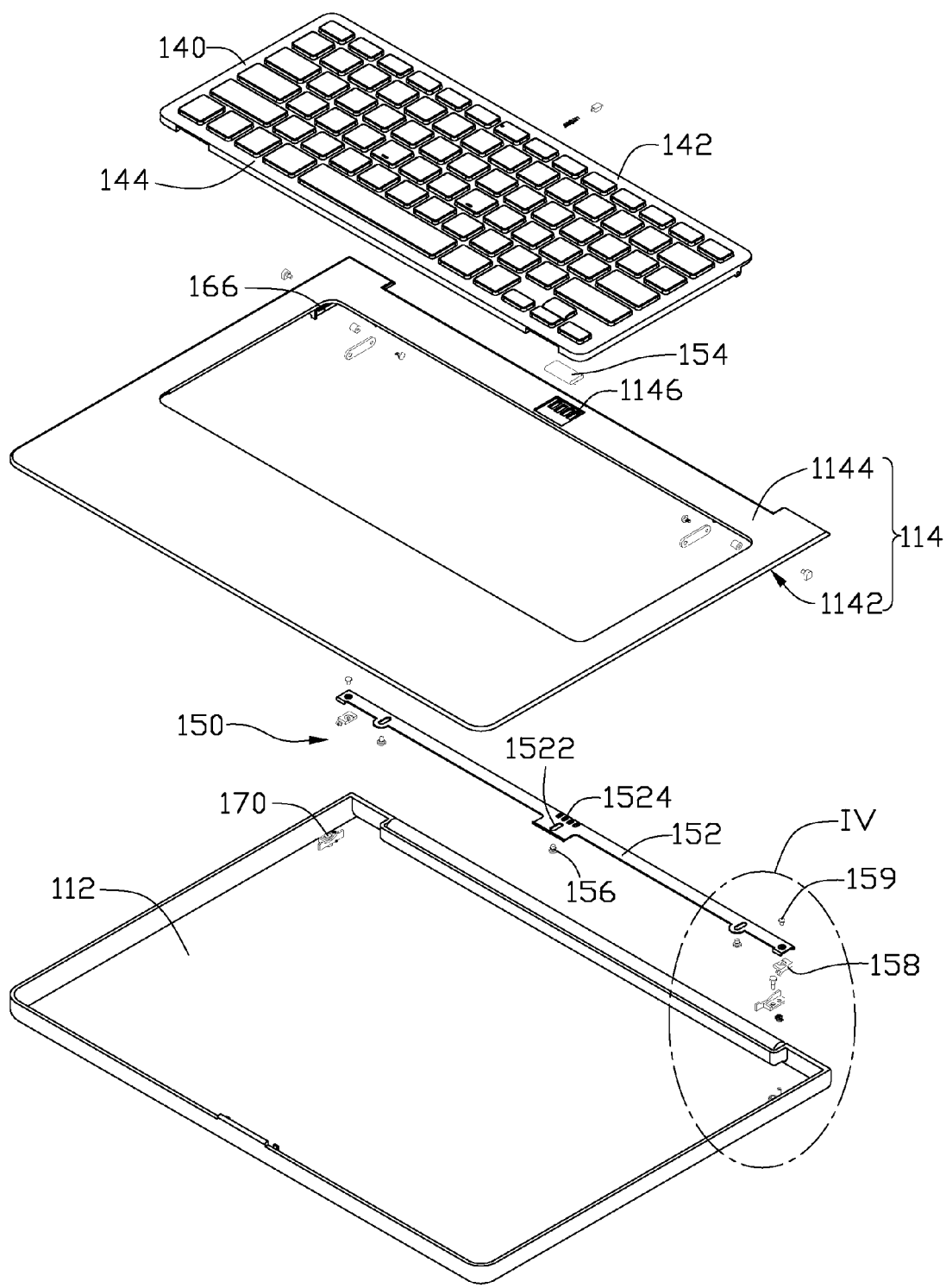
FIG. 3 is a partially exploded, isometric view of the main body of the portable computer of FIG. 1.

Referring to FIGS. 1-3, a portable computer 100, according to an exemplary embodiment, includes a main body 110, a pivot shaft 120, a display 130, a keyboard 140, a pushing member 150, two connecting rods 160, and two restricting members 170. Each connecting rod 160 is connected to each restricting member 170. The pivot shaft 120 is configured for rotatably connecting the main body 110 to the display 130. The pushing member 150 is movably connected to the main body 110. The connecting rods 160 are positioned on two sides of the main body 110, respectively.

Referring to FIGS. 3, and 5-7, the main body 110 includes a bottom sheet 112, a panel 114 opposite to the bottom sheet 112, and two guiding portions 116 perpendicularly extending from two sides of the panel 114 towards the bottom sheet 112. The panel 114 includes a first surface 1142 facing the bottom sheet 112 and a second surface 1144 opposite to the first surface 1142. Four panel holes 1146 are defined in the panel 114. Three first threaded holes 1148 are defined in the first surface 1142. A guiding slot 1162 is defined in each guiding portion 116. The bottom sheet 112 faces the panel 114 to form a receiving cavity 118 (see FIG. 13). A central processing unit (CPU) (not shown) and a hard disk (HD) (not shown) are assembled inside the receiving cavity 118.

Figure 5:
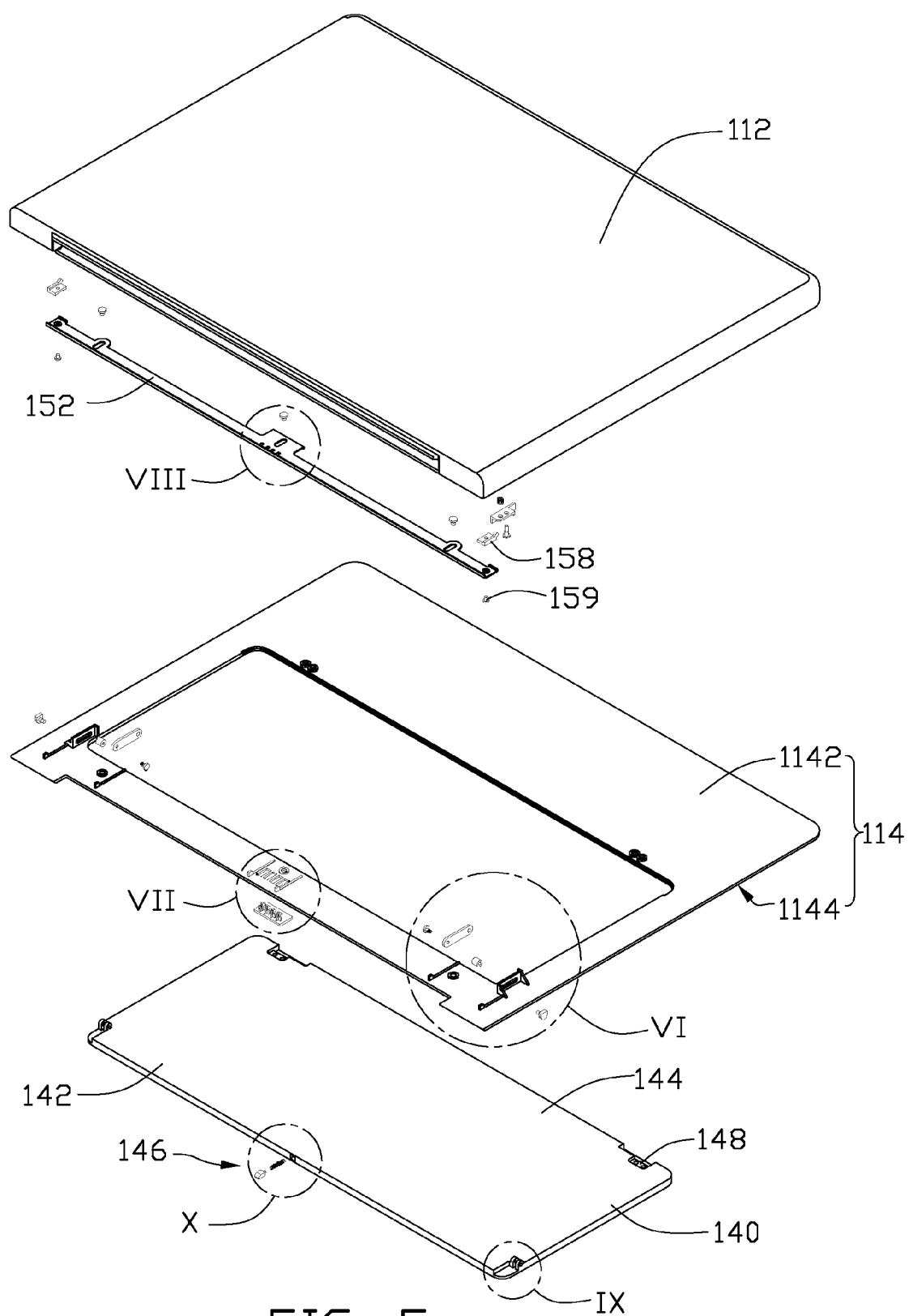
FIG. 5 is similar to FIG. 3, but viewing the portable computer from another angle.
Figure 7:
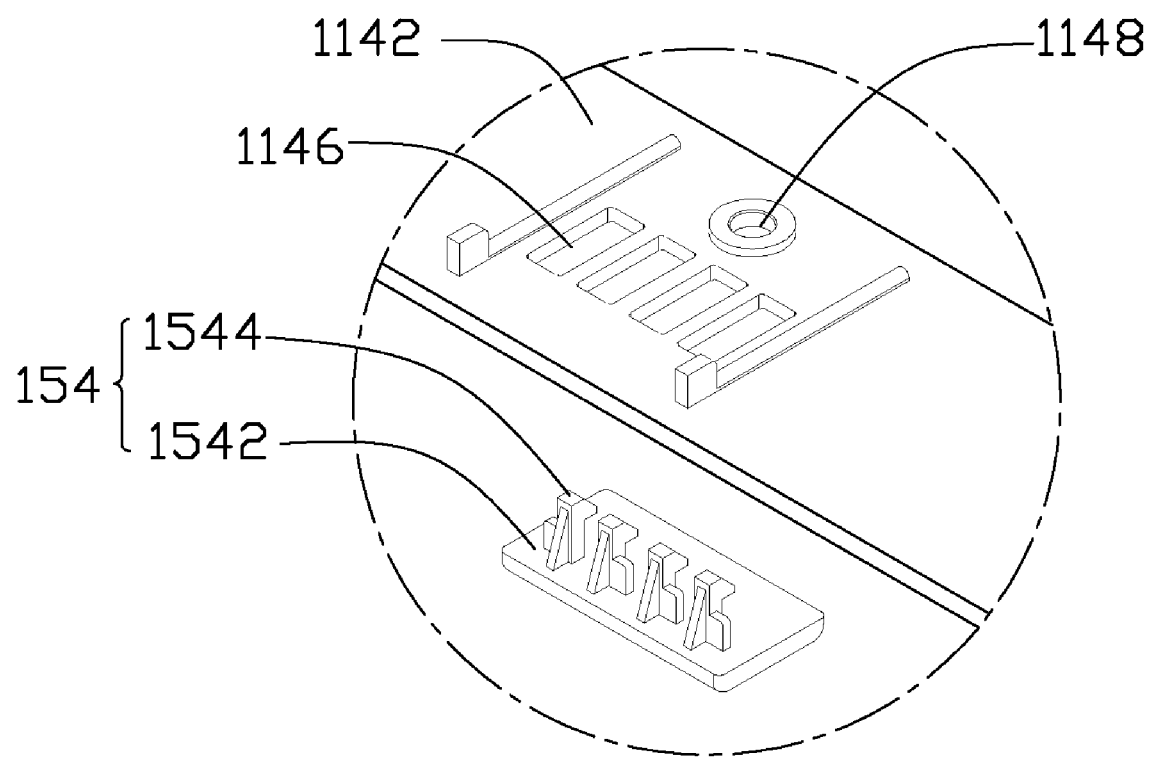
FIG. 7 is an enlarged view of section VII of FIG. 5.
Figure 8:
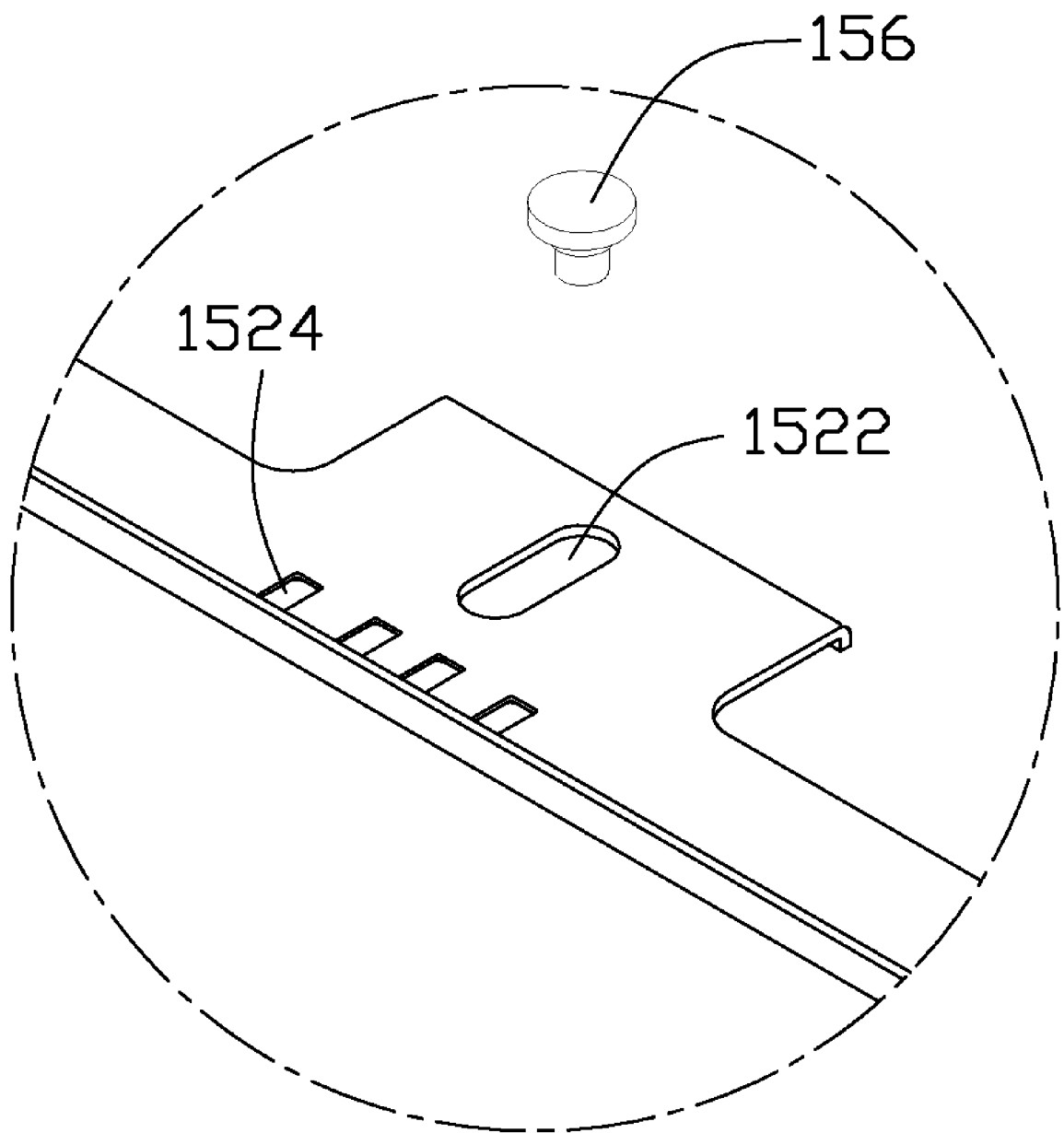
FIG. 8 is an enlarged view of section VIII of FIG. 5.

Referring to FIGS. 2, 5, and 7, the keyboard 140 includes a first side 142 close to the pivot shaft 120, a second side 144 away from the pivot shaft 120, a blocking member 146, and two auto-flick pivots 148.

Figure 9:
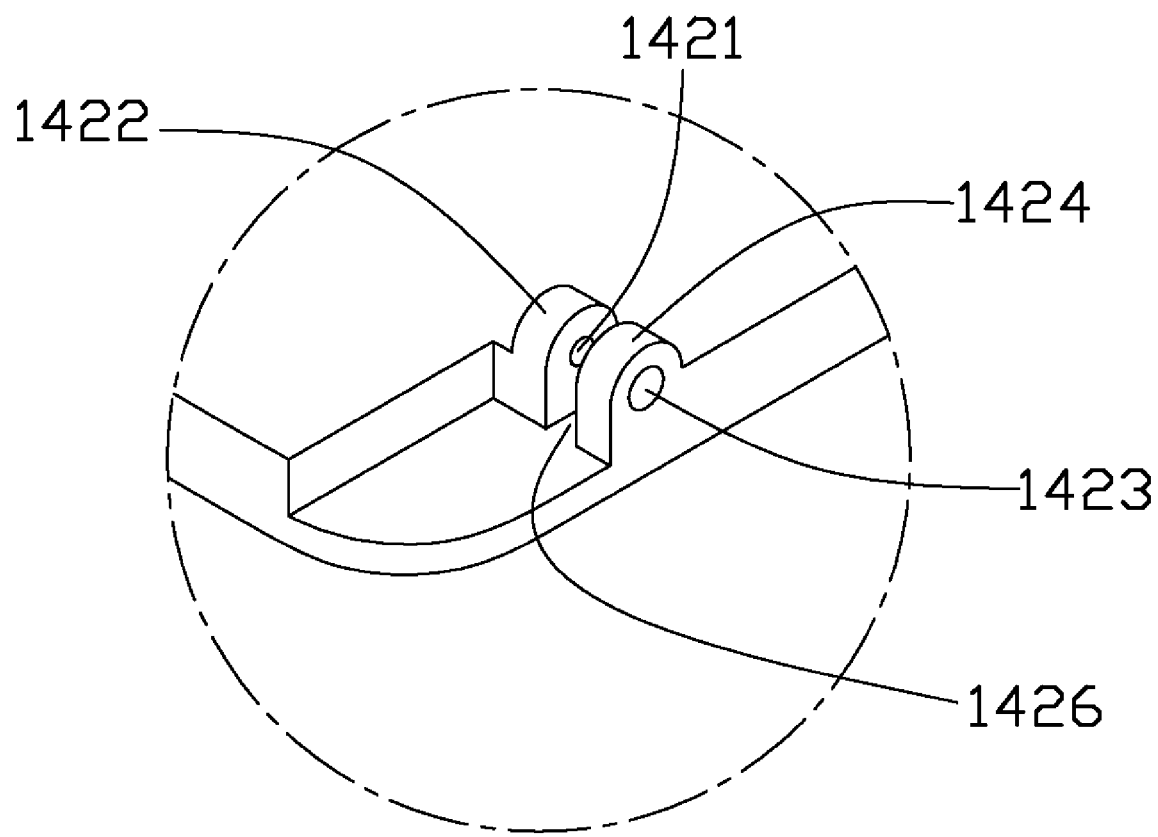
FIG. 9 is an enlarged view of section IX of FIG. 5.
Figure 10:
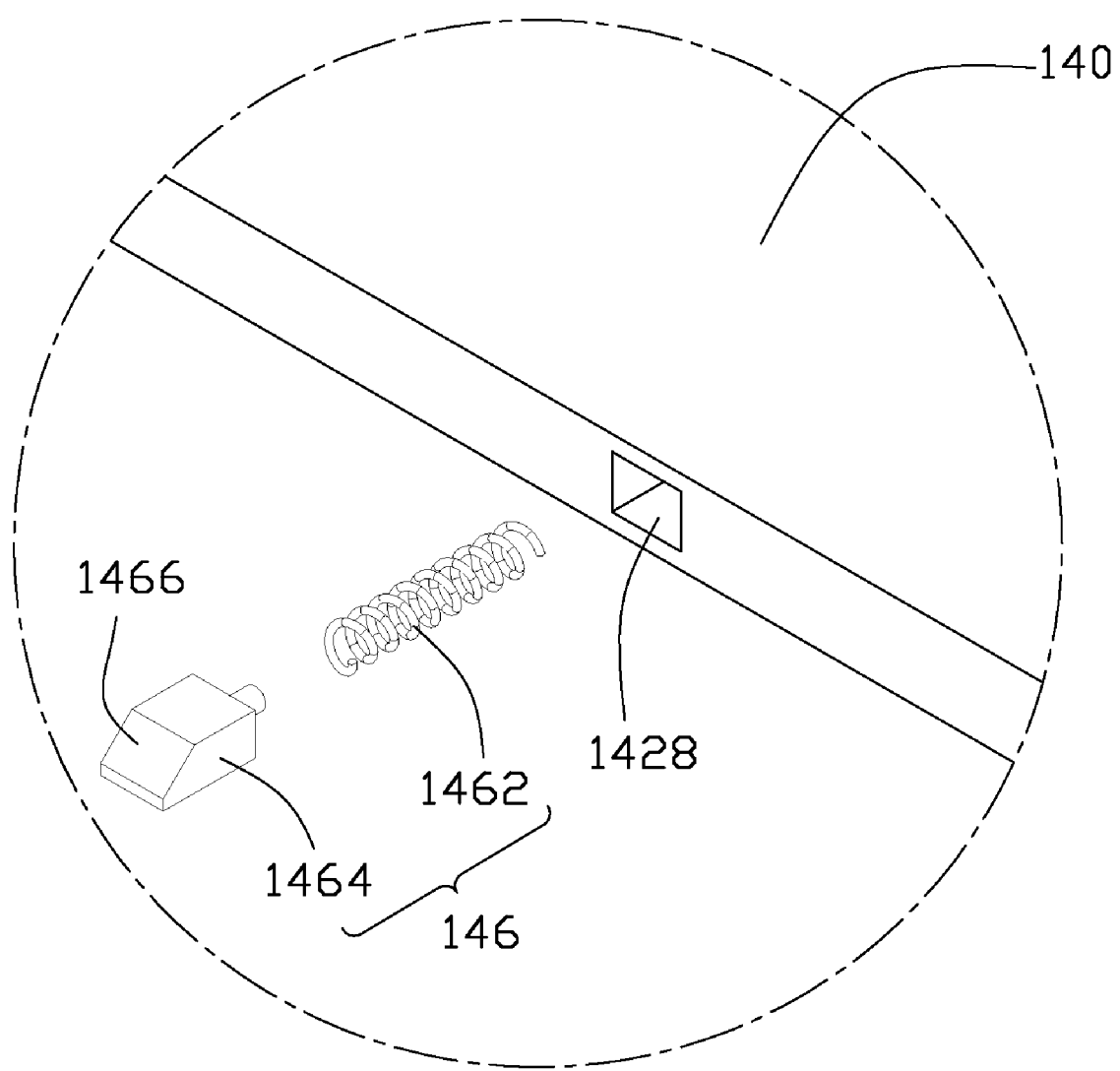
FIG. 10 is an enlarged view of section X of FIG. 5.

Referring to FIGS. 9-10, a first protrusion 1422 and an opposite second protrusion 1424 extend from each end of the first side 142. A fixing through hole 1421 is defined in each first protrusion 1422. A fixing threaded hole 1423 is defined in each second protrusion 1424 corresponding to the fixing through hole 1421. The first protrusion 1422 and the second protrusion 1424 are apart from each other to form a fixing room 1426. A receiving hole 1428 is defined in the first side 142 corresponding to the blocking member 146.

The blocking member 146, positioned on the first side 142 corresponding to the panel hole 1146, includes a first elastic portion 1462 and a blocking portion 1464. In this embodiment, the first elastic portion 1462 is a spring. One end of the first elastic portion 1462 is fixed to the bottom of the receiving hole 1428, and the other end of the first elastic portion 1462 is connected to the blocking portion 1464. The blocking portion 1464 includes an inclined plane 1466 tilted relative to the bottom sheet 112.

Figure 11:
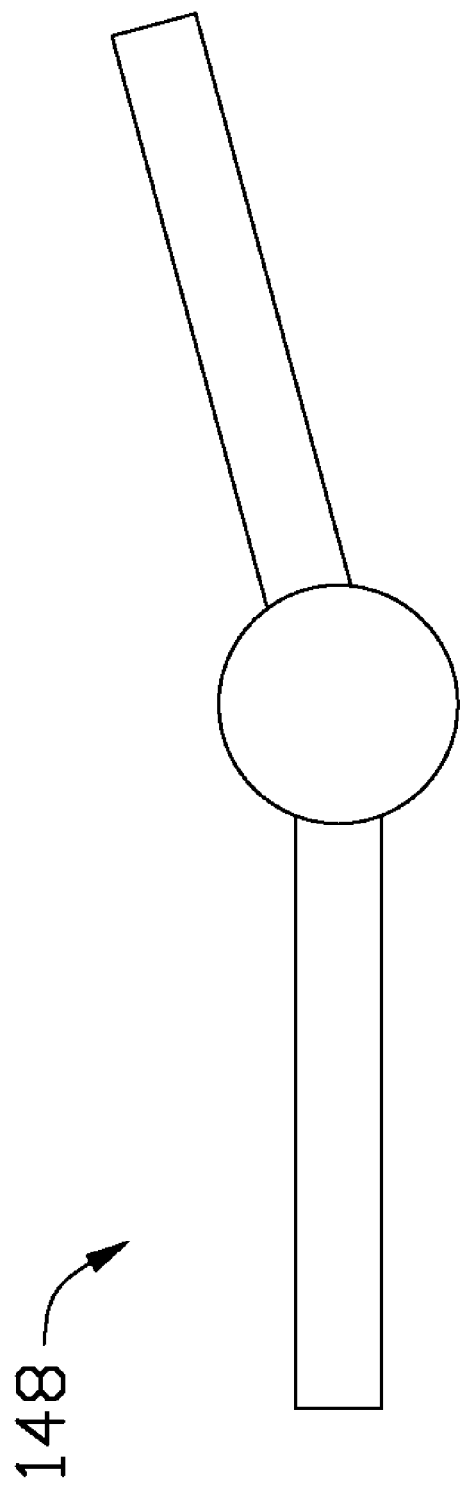
FIG. 11 is a schematic view of an auto-flick pivot of the portable computer of FIG. 5, showing the auto-flick pivot in a natural state.

Referring to FIGS. 3 and 5, the auto-flick pivots 148 are fixed to opposite ends of the second side 144 respectively. When the auto-flick pivot 148 is in a natural state, the auto-flick pivot 148 is partially folded (see FIG. 11). When the auto-flick pivot 148 is in a stressed state, the auto-flick pivot 148 is forced to fully unfold (see FIG. 12) by an external force. If the external force is released, the auto-flick pivot 148 becomes partially folded again. The auto-flick pivot 148 is connected to the bottom sheet 112 by a screw joint so that the keyboard 140 is rotatably connected to the main body 110. Alternatively, the auto-flick pivot 148 may be connected to the bottom sheet 112 by glue or welding joint.

Referring to FIGS. 3-5 and 7-8, the pushing member 150 includes an elongated pushing body 152, a controlling button 154, three first bolts 156 corresponding to the first threaded holes 1148, two pressing blocks 158 respectively positioned on two opposite ends of the pushing body 152, and two second bolts 159 corresponding to the two pressing blocks 158.

Three elongated holes 1522 are defined in the pushing body 152 corresponding to the first threaded holes 1148. Four body holes 1524 are defined in the pushing body 152 corresponding to the panel holes 1146. Two first through holes 1526 are defined in the pushing body 152 corresponding to the pressing blocks 158. Each first bolt 156 passes through the corresponding elongated hole 1522 and is engaged in the corresponding first threaded hole 1148 so that the pushing body 152 is movably connected to the first surface 1142.

The controlling button 154 includes a button body 1542 and four retaining tabs 1544 perpendicularly extending from the button body 1542 corresponding to the panel holes 1146 and the body holes 1524. Each retaining tab 1544 passes through the corresponding panel hole 1146, and is engaged with the pushing body 152 through the body hole 1524, and the button body 1542 abuts against the second surface 1144 so that the controlling button 154 is connected to the pushing body 152. Alternatively, the controlling button 154 may be connected to the pushing body 152 by glue or screw joint.

Each pressing block 158 includes a connecting portion 1582 and a pressing portion 1584 protruding from the connecting portion 1582 toward the bottom sheet 112. A second threaded hole 1586 is defined in the connecting portion 1582 corresponding to the first through hole 1526. Each second bolt 159 passes through the corresponding first through hole 1526 and is engaged in the corresponding second threaded hole 1586 so that each pressing block 158 is firmly connected to the pushing body 152. Alternatively, each pressing block 158 may be connected to the pushing body 152 by glue or welding joint in other embodiment.

Figure 6:
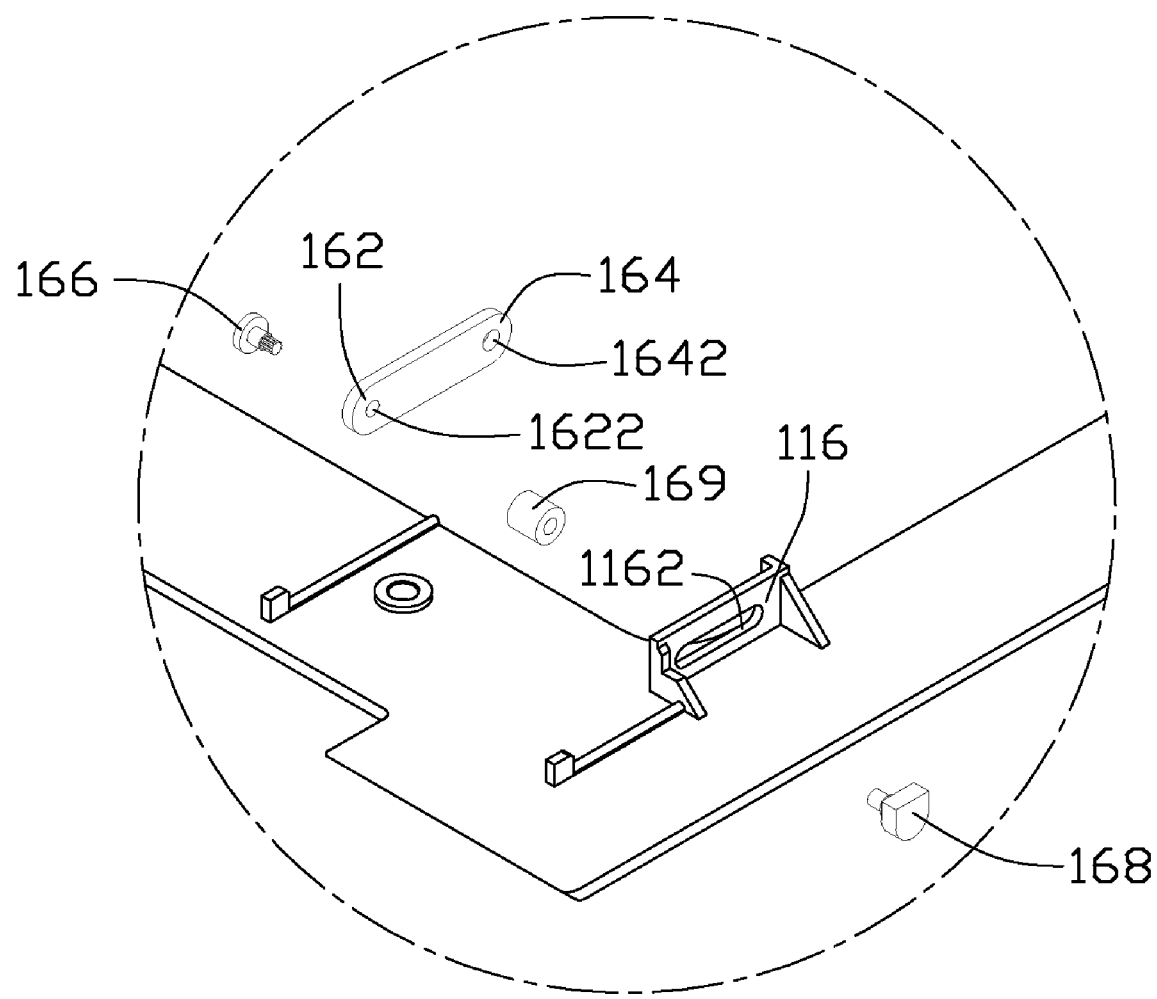
FIG. 6 is an enlarged view of section VI of FIG. 5.

Referring to FIGS. 2, 6 and 9, each connecting rod 160 includes a first connecting end 162 and an opposite second connecting end 164. A first connecting through hole 1622 is defined through the first connecting end 162. A second connecting through hole 1642 is defined through the second connecting end 164. The portable computer 100 further includes two first connecting bolts 166, two second connecting bolts 168, and two nuts 169 corresponding to the two second connecting bolts 168. The first connecting end 162 is received in the fixing room 1426. Each first connecting bolt 166 passes through the fixing through hole 1421, the first connecting through hole 1622, and is engaged in the fixing threaded hole 1423 so that the first connecting end 162 is movably connected to the keyboard 140. Each second connecting bolt 168 passes through the guide slot 1162, the second connecting through hole 1642, and is engaged with the nut 169 so that the connecting rod 160 is movably connected to the main body 110.

Figure 4:
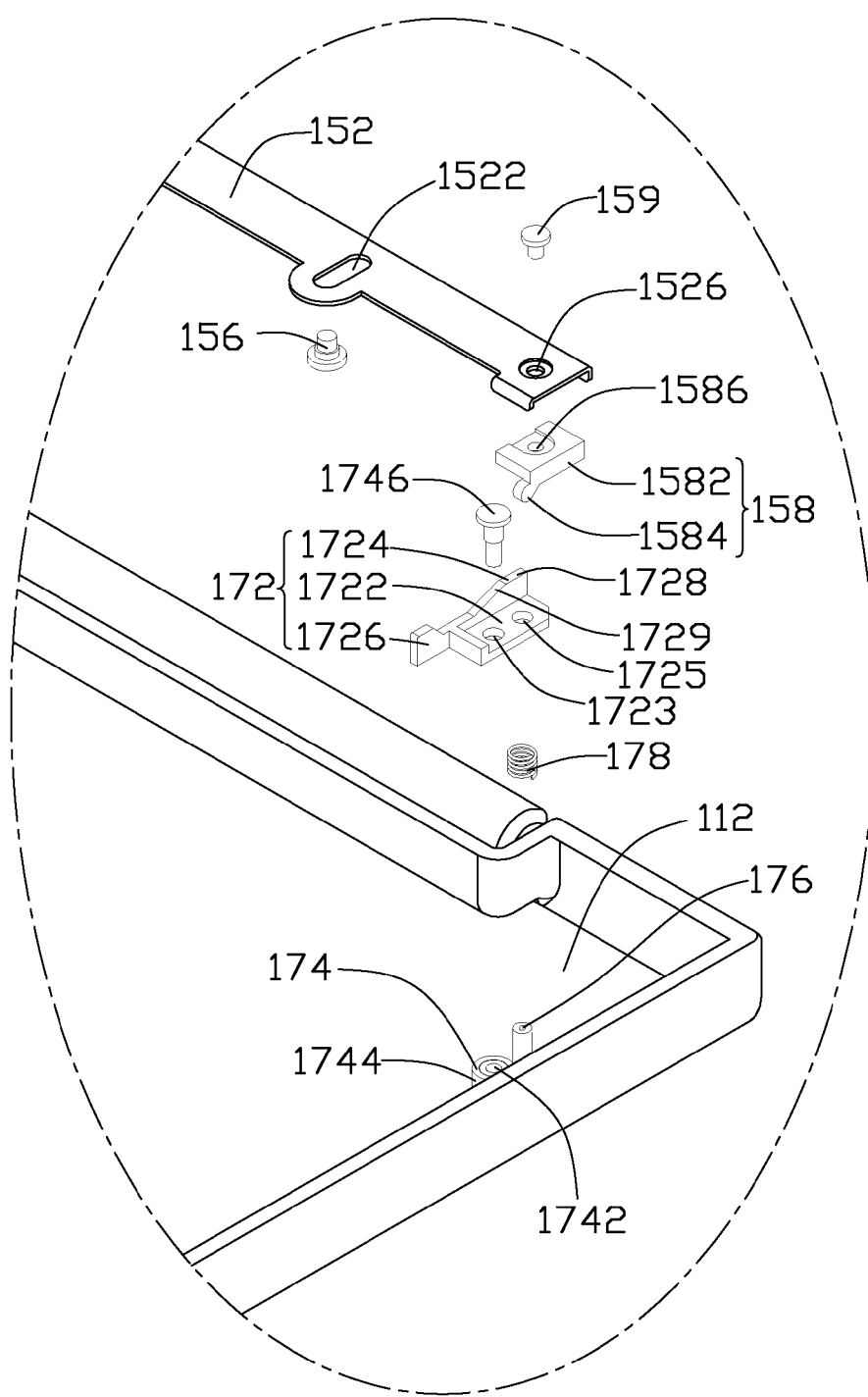
FIG. 4 is an enlarged view of section IV of FIG. 3.
Figure 14:
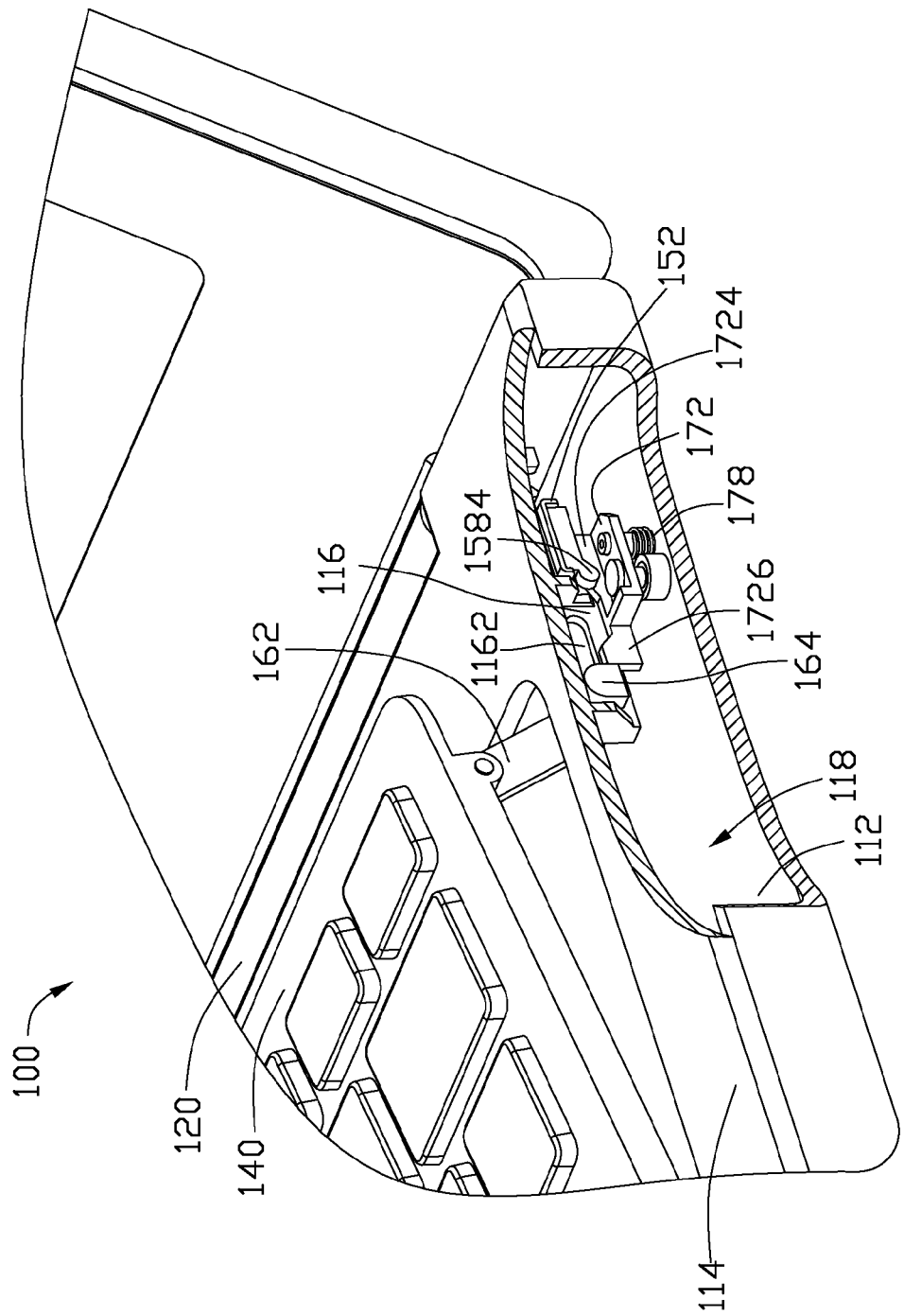
FIG. 14 is a partially enlarged, cutout view of the portable computer of FIG. 2.
Figure 15:
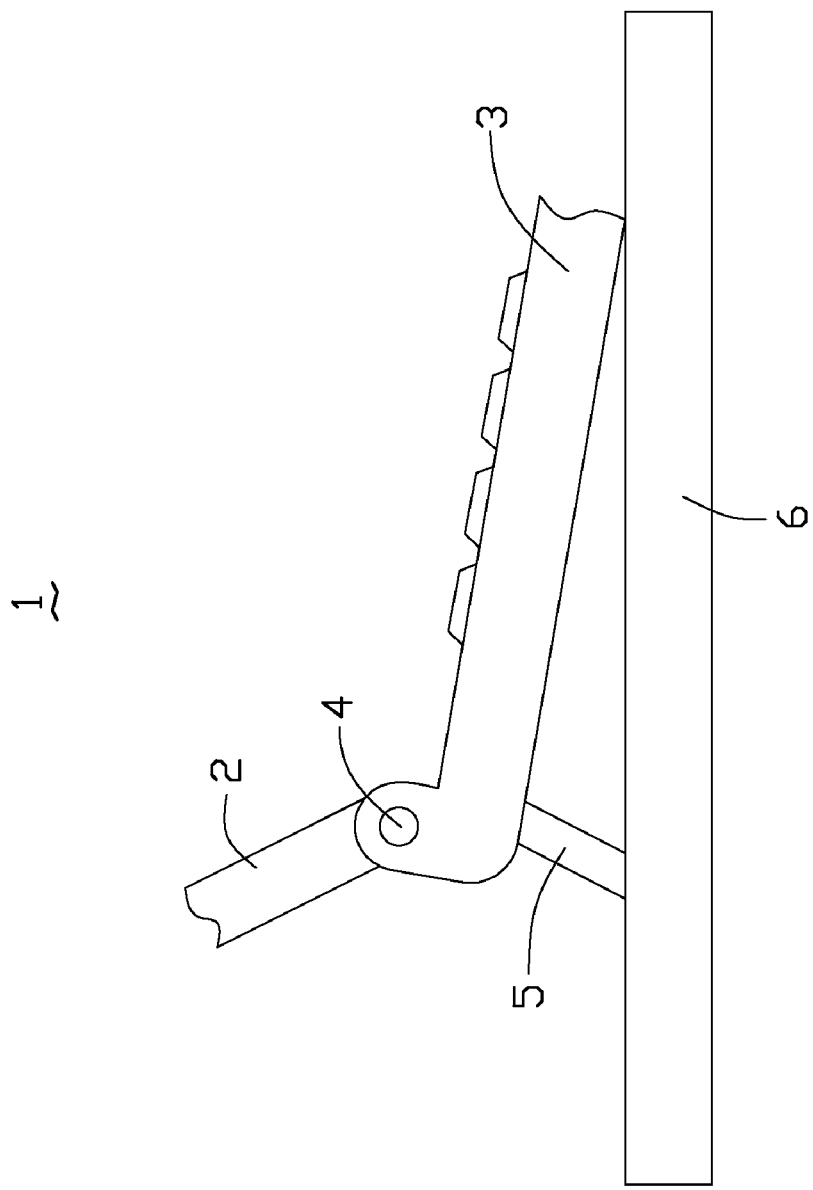
FIG. 15 is a schematic view of a related portable computer.

Referring to FIGS. 3-4 and 14, each restricting member 170, received in the receiving cavity 118, includes a restricting portion 172, a supporting portion 174, a guiding post 176, and a second elastic portion 178 around the guiding post 176. The supporting portion 174 and the guiding post 176 are perpendicularly positioned on the bottom sheet 112 and are apart from each other.

The restricting portion 172 includes a base 1722 parallel to the bottom sheet 112, a compression portion 1724 perpendicularly extending from the base 1722 away from the bottom sheet 112, and a contacting portion 1726. A second through hole 1723 and a third through hole 1725 are defined through the base 1722 corresponding to the supporting portion 174 and the guiding post 176 respectively. The compression portion 1724 contacts the pressing portion 1584 of the pushing member 150. The contacting portion 1726 is adjacent to the connecting rod 160. The compression portion 1724 includes a third surface 1728 parallel to the base 1722 and a fourth surface 1729 extending from the third surface 1728. The fourth surface 1729 is an inclined surface on the base 1722.

The supporting portion 174 includes a bolt holder 1744 and a third bolt 1746. A third threaded hole 1742 is defined in the bolt holder 1744 corresponding to the third bolt 1746. An outer diameter of the bolt holder 1744 is greater than the diameter of the second through hole 1723. The third bolt 1746 passes through the second through hole 1723 and is engaged in the third threaded hole 1742 and the restricting portion 172 is supported by the bolt holder 1744 and is moveable along the third bolt 1746.

The guiding post 176 passes through the third through hole 1725. In this embodiment, the second elastic portion 178 is a spring. One end of the second elastic portion 178 abuts against the bottom sheet 112, and the other end of the second elastic portion 178 abuts against the base 1722.

Figure 13:
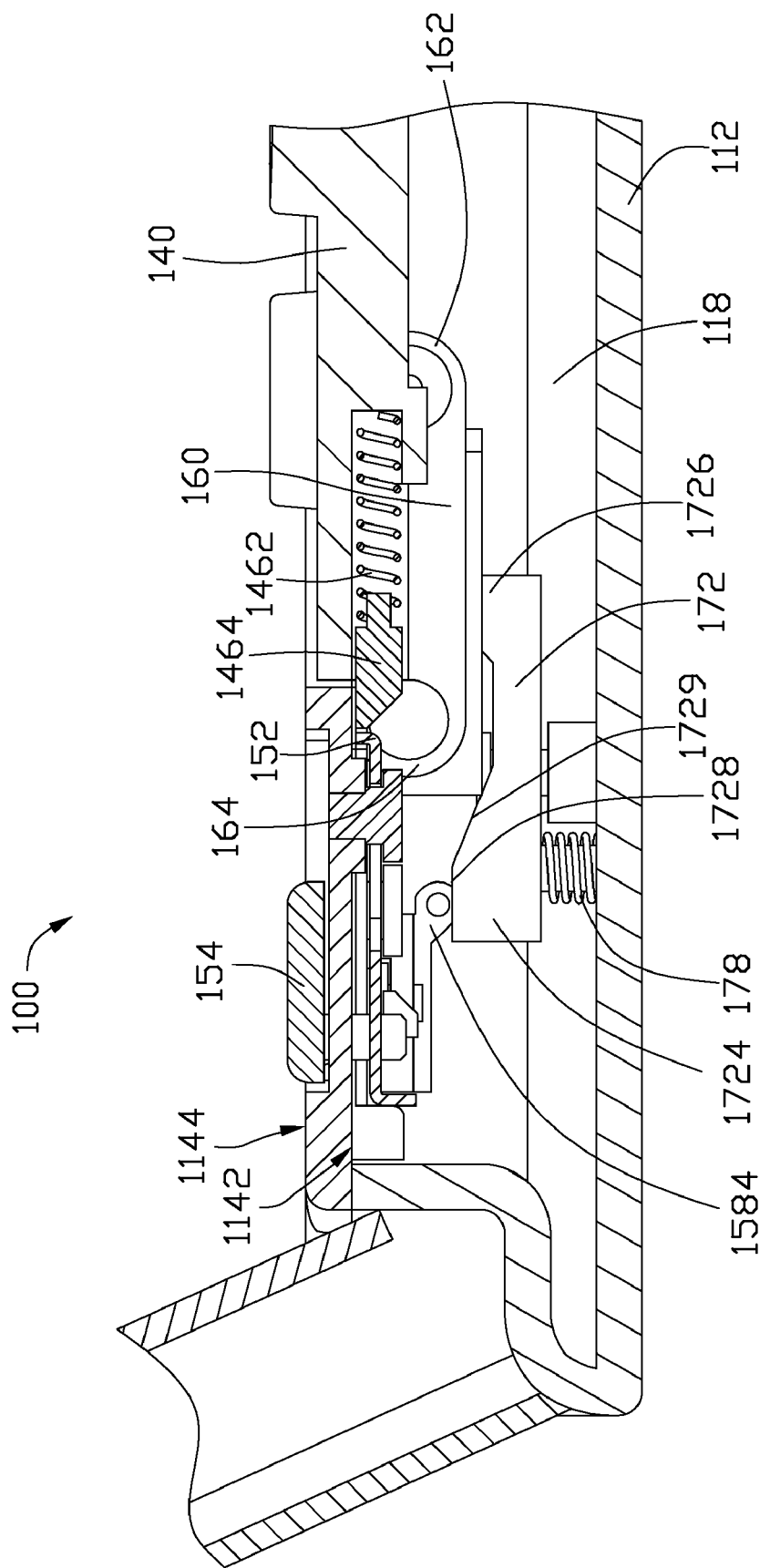
FIG. 13 is a partially enlarged, cross-sectional view taken along line XIII-XIII of FIG. 1.

Referring to FIGS. 13-14, the pushing body 152 is movably connected to the first surface 1142 and movable between a first position and a second position. When the pushing body 152 is in the first position, the blocking portion 1464 abuts against the first surface 1142. The pressing portion 1584 abuts against the third surface 1728 of the compression portion 1724. The restricting portion 172 presses the second elastic portion 178, and the keyboard 140 is received in the receiving cavity 118. When the pushing body 152 is pushed from the first position to the second position, the blocking portion 1464 moves away from the first surface 1142. The keyboard 140 is popped-up from the receiving cavity 118 by the activation of the auto-flick pivots 148 (see FIG. 5) and is tilted relative to the main body 110. Meanwhile, the pressing portion 1584 slides from the third surface 1728 to the fourth surface 1729 with the movement of the pushing body 152. The restricting portion 172 is lifted by the restoration of the second elastic portion 178. Therefore, the second connecting end 164 is blocked by the contacting portion 1726. As a result, the keyboard 140 is fixedly supported by the connecting rod 160.

When the portable computer 100 is in use, the pushing body 152 is pushed to move from the first position to the second position as follows: the controlling button 154 is moved away from the pivot shaft 120; the pushing body 152 is moved away from the pivot shaft 120; the blocking portion 1464 is pushed by the pushing body 152 to press the first elastic portion 1462 until the blocking portion 1464 is fully received in the receiving hole 1428. Therefore, the keyboard 140 rotates about the auto-flick pivots 148 by a force applied by the unfolded auto-flick pivots 148. The connecting rod 160 moves along the guide slot 1162 away from the pivot shaft 120. Meanwhile, the pressing portion 1584 slides from the third surface 1728 to the fourth surface 1729 as further movement of the controlling button 154 away from the pivot shaft 120. Therefore, the restricting portion 172 is lifted by the restoration of the second elastic portion 178. As a result, the connecting rod 160 is blocked by the contacting portion 1726, and the keyboard 140 is firmly supported by the connecting rod 160. Therefore, only the keyboard 140 is lifted, and the main body 110 remains flat on a surface, thereby the HD and the other electrical components assembled inside the main body 110 is or will not be damaged by the main body 110 falling.

Figure 12:
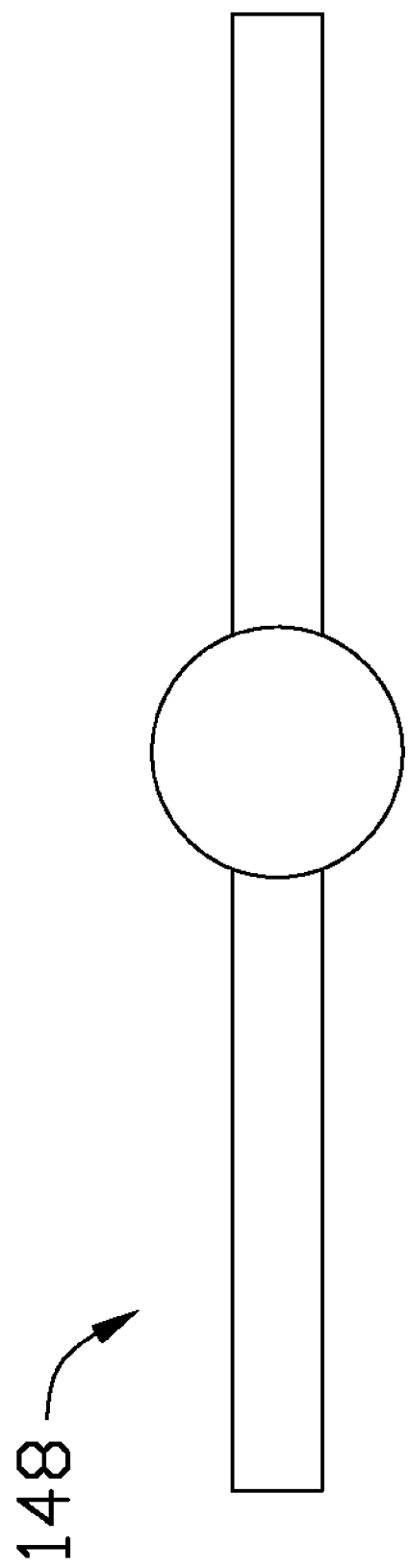
FIG. 12 is similar to FIG. 11, but showing the auto-flick pivot in a stressed state.

When the keyboard 140 needs to be received in the receiving cavity 118, the pushing body 152 is moved from the second position to the first position as follows: the controlling button 154 is pushed toward the pivot shaft 120; the pushing body 152 is moved toward the pivot shaft 120 with the movement of the controlling button 154; the pressing portion 1584 slides from the third surface 1728 to the fourth surface 1729. Therefore, the restricting portion 172 is depressed by the pressing portion 1584 to move toward the bottom sheet 112. The second elastic portion 178 is compressed. Meanwhile, the keyboard 140 rotates about the auto-flick pivots 148 to be received in the receiving cavity 118. The connecting rod 160 can move along the guide slot 1162 toward the pivot shaft 120 because the contacting portion 1726 of the restricting portion 172 is depressed. The blocking portion 1464 is retracted in the receiving hole 1428 by the panel 114. As the keyboard 140 is fully received in the receiving cavity 118, the blocking portion 1464 is pushed by the restoration of the first elastic portion 1462 to abut the first surface 1142 and the auto-flick pivot 148 is folded as FIG. 12 shows. As a result, the keyboard 140 is fully and firmly received in the receiving cavity 118.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A portable computer comprising:
   a main body comprising a bottom sheet and a panel, the panel comprising a first surface opposite to the bottom sheet, the bottom sheet and the panel cooperatively forming a receiving cavity;
   a display;
   a pivot shaft connecting the main body and the display;
   a keyboard comprising a first side close to the pivot shaft, a second side away from the pivot shaft, a flexible blocking member, and at least one auto-flick pivot positioned on the second side;
   a pushing member comprising an elongated pushing body and two pressing blocks respectively positioned on two sides of the pushing body;
   two connecting rods positioned on two sides of the main body; and
   two restricting members received in the receiving cavity corresponding to the two connecting rods respectively, each restricting member comprising a liftable restricting portion positioned on the bottom sheet; wherein
   the at least one auto-flick pivot connects the keyboard to the main body, each connecting rod movably connects to the keyboard and the main body, the pushing body is movably connected to the first surface and moves from a first position of the first surface to a second position of the first surface, when the pushing body is in the first position, the blocking member abuts against the first surface, the pressing block abuts against the restricting portion, the keyboard is received in the receiving cavity; when the pushing body is pushed to the second position, the blocking member is pushed to move away from the first surface, the keyboard is popped-up from the receiving cavity by the activation of the at least one auto-flick pivot and is tilted relative to the main body, the pressing block is away from the restricting portion, the restricting portion is lifted to contact the connecting rod, and the keyboard is supported by the connecting rod.

2. The portable computer as claimed in claim 1, wherein at least two first threaded holes are defined on the first surface, the pushing member further comprises at least two first bolts corresponding to the at least two first threaded holes, at least two elongated holes are defined in the pushing body corresponding to the at least two first threaded holes and the at least two first bolts, and each first bolt passes through the corresponding elongated hole and is engaged in the corresponding first threaded hole so that the pushing body is movably connected to the first surface.

3. The portable computer as claimed in claim 2, wherein the pushing member further comprises a controlling button, at least one panel hole is defined in the panel corresponding to the controlling button, and the controlling button passes through the at least one panel hole to abut against the pushing body.

4. The portable computer as claimed in claim 3, wherein the panel further comprises a second surface opposite to the first surface, at least one body hole is defined in the pushing body corresponding to the at least one panel hole, the controlling button comprises a button body and at least one retaining tab perpendicularly extending from the button body corresponding to the at least one panel hole and the at least one body hole, each retaining tab passes through the corresponding panel hole, the corresponding body hole and abuts against the pushing body, and cooperatively the pushing body abuts against the second surface so that the button body is attached to the pushing body.

5. The portable computer as claimed in claim 3, wherein the button body is attached to the pushing body by glue or screw joint.

6. The portable computer as claimed in claim 3, wherein the at least one panel hole is positioned on the panel in the middle between the two pressing blocks.

7. The portable computer as claimed in claim 2, wherein each pressing block comprises a connecting portion connecting to the pushing body and a pressing portion extending from the connecting portion, and the pressing portion is tilted relative to the bottom sheet.

8. The portable computer as claimed in claim 7, wherein the pushing member further comprises two second bolts corresponding to the pressing blocks, two first through holes are defined in the pushing body corresponding to the pressing blocks respectively, a second threaded hole is defined in each connecting portion corresponding to the first through hole, and each second bolt passes through the corresponding first through hole and is engaged in the corresponding second threaded hole so that each pressing block connects to the pushing body.

9. The portable computer as claimed in claim 7, wherein each pressing block connects to the pushing body by glue or welding joint.

10. The portable computer as claimed in claim 1, wherein a receiving hole is defined in the first side, the blocking member is received in the receiving hole, the blocking member comprises a blocking portion and a first elastic portion, one end of the first elastic portion is fixed to the bottom of the receiving hole, and the other end of the first elastic portion is connected to the blocking portion.

11. The portable computer as claimed in claim 10, wherein the first elastic portion is a spring.

12. The portable computer as claimed in claim 10, wherein the blocking portion includes an inclined plane being tilted relative to the bottom sheet.

13. The portable computer as claimed in claim 2, wherein each of the two restricting members further comprises a supporting portion, a guiding post, and a second elastic portion around the guiding post, the supporting portion and the guiding post are perpendicularly positioned on the bottom sheet and are apart from each other, the restricting portion sleeves the guiding post and is supported by the supporting portion, one end of the second elastic portion abuts against the bottom sheet, and the other end of the second elastic portion abuts against the restricting portion.

14. The portable computer as claimed in claim 13, wherein each restricting portion comprises a base parallel to the bottom sheet, a compression portion perpendicularly extending from the base away from the bottom sheet, and a contacting portion, a second through hole and a third through hole are defined in the base, the supporting portion comprises a bolt holder and a third bolt, a third threaded hole is defined in the bolt holder corresponding to the third bolt, the outside diameter of the bolt holder is greater than the diameter of the second through hole, and the third bolt passes through the second through hole and is engaged in the third threaded hole so that the base is supported by the bolt holder.

15. The portable computer as claimed in claim 14, wherein the guiding post passes through the third through hole, the compression portion is adjacent to the pushing member, the contacting portion is adjacent to the connecting rod, the compression portion comprises a third surface parallel to the base and a fourth surface stretching from the third surface, and the fourth surface is titled relative to the base.

16. The portable computer as claimed in claim 13, wherein the second elastic portion is a spring.

17. The portable computer as claimed in claim 1, wherein two guiding portion perpendicularly extend from two sides of the panel towards the bottom sheet respectively, a guiding slot is defined in each guiding portion, each connecting rod comprises a first connecting end and an opposite second connecting end, the first connecting end connects to the keyboard by hinge joint, and the second connecting end is movably positioned in the guiding slot.

18. The portable computer as claimed in claim 17, wherein the portable computer further comprises two first connecting bolts, a first connecting through hole is defined in the first connecting end, a first protrusion and an opposite second protrusion extend from each end of the first side, a fixing through hole is defined in each first protrusion, a fixing threaded hole is defined in each second protrusion corresponding to the fixing through hole, each first connecting bolt passes through the fixing through hole, the first connecting through hole, and is engaged in the fixing threaded hole so that the first connecting end movably connects to the keyboard.

19. The portable computer as claimed in claim 17, wherein the portable computer further comprises two second connecting bolts and two nuts corresponding to the second connecting bolts, a second connecting through hole is defined in the second connecting end, each second connecting bolt passes through the guide slot, the second connecting through hole, and is engaged with the nut so that the second connecting end movably connects to the main body.

* * * * *